US007702803B2

(12) United States Patent
Pamadi et al.

(10) Patent No.: US 7,702,803 B2
(45) Date of Patent: Apr. 20, 2010

(54) SECURITY ENHANCEMENT FOR SNMPV2C PROTOCOL

(75) Inventors: Vivek Anand Pamadi, Bangalore (IN); Hariharan Srinivasan, Coimbatore (IN)

(73) Assignee: WIPRO Limited, Bangalore, Karnataka (IN)

( * ) Notice: Subject to any disclaimer, the term of this patent is extended or adjusted under 35 U.S.C. 154(b) by 426 days.

(21) Appl. No.: 11/678,575

(22) Filed: Feb. 24, 2007

(65) Prior Publication Data

US 2008/0209204 A1 Aug. 28, 2008

(51) Int. Cl.
*G06F 15/16* (2006.01)
(52) U.S. Cl. .................. 709/229; 709/203; 709/219; 709/220; 709/223; 709/224; 710/36; 710/104
(58) Field of Classification Search .......... 709/203, 709/219, 220, 223, 224, 229; 710/36, 104
See application file for complete search history.

(56) References Cited

U.S. PATENT DOCUMENTS

| 5,991,806 | A  | * | 11/1999 | McHann, Jr. | ............... | 709/224 |
| 7,076,542 | B2 | * | 7/2006  | Yoshino     | ............... | 709/223 |
| 2003/0105861 | A1 | * | 6/2003 | Lee       | ............... | 709/224 |
| 2008/0155067 | A1 | * | 6/2008 | Rivera     | ............... | 709/220 |

OTHER PUBLICATIONS

Rivest, R., "The MD5 Message-Digest Algorithm", RFC 1321, MIT Laboratory for Computer Science, Apr. 1992.
Encryption Algorithm, American National Standards institute. ANSI X3.92-1981,(Dec. 1980).
Data Encryption Algorithm—Modes of Operation, American National Standards Institute. ANSI X3.106-1983, (May 1983).
DES Modes of Operation, National Institute of Standards and Technology. Federal Information Processing Standard (FIPS) Publication 81, (Dec. 1980).
Security Protocols for Simple Network Management Protocol Version 2 RFC 1446.

* cited by examiner

*Primary Examiner*—Jinsong Hu
(74) *Attorney, Agent, or Firm*—Prakash Nama; Global IP Services, PLLC

(57) ABSTRACT

A method of enhancing security in network management for SNMPv2c packet traffic over internet between a (sending) manager location and an (receiving) agent location uses a pluggable security application function. The manager location has a manager side security application (MSA) and may include one or more managers. The agent location has an agent side security application (ASA) and may include one or more agents. Upon a SNMP request from a manager to the MSA, the request is encrypted, appended with authentication digest and sent to a registered agent in ASA. The MSA receives a secured response packet back from the ASA, which after authentication decrypts and forwards it to the intended manager. Thus, an existing protocol implementation is maintained, while reducing additional network overhead. The method obviates the use of IPSec tunnels and migration to SNMPv3.

19 Claims, 4 Drawing Sheets

| PACKET LENGTH 1Byte | MD5 DIGEST 16Bytes | Encrypted Portion ||| 
|---|---|---|---|---|
| | | AGENT IP Address 4Bytes | Agent Port No. 2Bytes | NORMAL SNMP PACKET |

Secured Request Packet

FIG. 4

| PACKET LENGTH 1Byte | MD5 DIGEST 16Bytes | Encrypted Portion |
|---|---|---|
| | | NORMAL SNMP PACKET |

Secured Response Packet

SECURITY ENHANCEMENT FOR SNMPV2C PROTOCOL

FIELD OF THE INVENTION

This invention is directed to providing a solution to overcome the security threats prevailing in SNMP (Simple Network Management Protocol) communications. The present invention teaches a security application that can be plugged between a manager and an agent in an SNMP network.

BACKGROUND OF THE INVENTION

The SNMP is a widely deployed protocol that is commonly used to monitor and manage network devices. Presently, SNMP is one of the most ubiquitous services running on Internet-based hosts extensively. However, hundreds or even thousands of different devices that rely on SNMP have been found to be vulnerable to security compromises. One version of the SNMP namely SNMPv2c, has advantages over the simple SNMP.

The SNMPv2c version has enjoyed success as a management solution, but it has multiple shortcomings, the most notable of which is that it lacks strong security. Some of the security threats are:
  Masquerading
  Modification of Information.
  Message Stream Modification.

The only security features generally used in SNMPv2c are the community strings which are sent without any encryption which could be extracted easily by intruders by sniffing the packets. It is noted that SNMPv3 offers a certain degree of privacy. SNMPv3, in order to provide enhanced privacy and security features adopts a User-Based Security Model (USM) for authentication and privacy. Two different keys are used one for privacy called encryption key or privKey and one for Authentication called authKey, but all the privacy and enhanced security is achieved at the cost of network overhead. In particular, eventhough SNMPv3 offers security it however introduces tremendous overhead into the network.

The other security alternative currently used for SNMP is IPSec. As known, IPSec is a connection oriented service. Establishing such connection oriented services for occasional UDP (User Datagram Protocol) based SNMP queries is not cost effective at times.

SUMMARY OF THE INVENTION

This invention proposes a cost effective solution for the security threat prevailing in the network management based on SNMPv2c protocol, without modifying the existing protocol structure, at the same time keeping the network overhead to a minimum. The present invention teaches a security application that can be plugged between a manager and an agent for an existing SNMPv2c version. The inventive approach provides Secure Network Management, maintaining the existing protocol implementation and reducing additional network overhead. Thus, the need to use SNMPv3 to ensure security may be obviated, noting in particular that there are disadvantages to implementing SNMPv3. As aforesaid, though SNMPv3 has rich authentication and security features, it has however issues of network overhead and administration overhead.

The present approach aims to enhance the security features for the present SNMPv2c version of SNMP without modifying the existing protocol structure or implementation. The solution involves providing pluggable security applications which can provide Authentication and also Encryption. The invention is of great use for network management professionals and network administrators who are interested in secured network management and monitoring using SNMP.

Though SNMPv2c is successful and generally preferred because of its simple framework, it lacks sufficient security. Therefore it is always risky and insecure to use the SNMP over internet for managing devices remotely. The only security provided by SNMPv2c is community string, which is a plain text that can be sniffed easily.

The principal security threats for SNMP are:
Modification of Information:
  The SNMPv2 protocol provides the means for management stations to interrogate and to manipulate the value of objects in a managed agent. The modification threat is the danger that some party may alter in-transit messages generated by an authorized party in such a way as to effect unauthorized management operations, including falsifying the value of an object.
Masquerade:
  The SNMPv2 administrative model includes an access control model. Access control necessarily depends on knowledge of the origin of a message. The masquerade threat is the danger that management operations not authorized for some party may be attempted by that party by assuming the identity of another party that has the appropriate authorizations.
Message Stream Modification:
  The SNMPv2 protocol is based upon a connectionless transport service which may operate over any sub network service. The re-ordering, delay or replay of messages can and does occur through the natural operation of many such sub network services. The message stream modification threat is the danger that messages may be maliciously re-ordered, delayed or replayed to an extent which is greater than what can occur through the natural operation of a sub network service, in order to effect unauthorized management operations.
Disclosure:
  The disclosure threat is the danger of eavesdropping on the exchanges between managed agents and a management station. The information thus leaked may disclose some of the valuable secured data, whereby protecting against this threat is mandatory. The above threats are especially significant in wireless networks, where it is sometimes relatively easy for hackers to intercept, misuse or modify messages.

Some existing solutions for addressing security threats are:
Migrating to SNMPv3.
Using IPSec Tunnels.

SNMPv3 implements security features at the application level ensuring that the communication channel is truly protected from end to end. Though SNMPv3 provides required security for the SNMP, it however comes at the cost of network overhead. The new SNMPv3 message format is considerably longer and more complex than the SNMPv2c message format.

Embedding the security features such as cryptographic calculations in the SNMP agent which is mostly a low priority process, places additional computational load on the agent. This possibly degrades the performance of the device. Further, it also involves more configuration and administration.

The other security mechanism used to secure SNMP is an IPSec tunnel. Since IPSec is a connection oriented service, establishing an IPSec tunnel for occasional SNMP query will be costly at times. The required ESP header extensions include several extra fields that impose additional overhead on the network. The security parameters which include index sequence number, pad length, and next header fields, are all fixed in length, consuming at least an additional 10 bytes.

The present inventive approach aims to enhance the security features for the present SNMPv2c version of SNMP without modifying the existing protocol structure or implementation and without incurring an undue overhead-burden on the network. The present invention in one form resides in a method of providing security in network management for SNMP (Simple Network Security Management Protocol) packet traffic between a manager location and an agent location, comprising using a pluggable security application function, the method including the steps of: using a manager side security application (MSA) at the (sending) manager location, and an agent side security application (ASA) at the (receiving) agent location; sending an SNMP request from the manager location to the MSA after adding the agent information to the SNMP request, and encrypting and adding authentication digest before sending it to the ASA; the ASA upon receiving the secured packet, authenticating and decrypting to extract agent information and plain SNMP packet; ASA sending the plain SNMP packet to the agent and receiving the response; encrypting and adding authentication digest to the response and sending it to the MSA; the MSA receiving a secured response from the ASA, authenticating, decrypting and forwarding the same to a respective manager; and optionally, the ASA on receiving a trap packet from an agent, encrypting, adding authentication digest and sending the same to the MSA; the MSA receiving a secured trap packet, authenticating and decrypting the secured packet and sending the secured trap packet to the intended manager. The SNMP traffic may be over the internet. Expediently, the manager and the agent locations may have one or more managers and agents respectively which are arranged through an internal network. Alternatively, the managers and the agents may be arranged in an external network such as the internet-manager side security application (MSA) at the (sending) manager location, and an agent side security application (ASA) at the (receiving) agent location.

The invention in a second form resides in a method of providing security in network management for SNMP (Simple Network Security Management Protocol) packet traffic over internet between a sending manager location and a receiving agent location, the sending manager location including one or more managers and a manager side security application (MSA), the receiving agent location including one or more agents and an agent side security application (ASA), the method comprising using a pluggable security application function, the pluggable security function including the steps of: upon a SNMP request from a manager to the MSA, authenticating, encrypting and sending the request to a registered agent in the ASA; the MSA receiving a secured response packet back from the ASA, decrypting and forwarding it to a intended respective manager.

Also included in the scope of the invention is a computer readable medium encoded with data/instruction which when executed by a computing platform would result in execution of a method recited in any of the paragraphs supra. Embodiments of the present subject matter may be implemented in conjunction with program modules, including functions, procedures, data structures, application programs, etc., for performing tasks, or defining abstract data types or low-level hardware contexts. Examples of said tasks in the context of this invention include: implementation of SFTP (Secure File Transfer Protocol), and, on the manager side: create-send-process SendRequest—PDU (Protocol Data Unit) message, and the agent side: make changes, CreateReasponse—PDU message.

BRIEF DESCRIPTION OF THE DRAWING

A more detailed understanding of the invention may be had from the following detailed description of embodiments, wherein reference is made to the accompanying drawings that form a part hereof, and in which are shown by way of illustration specific embodiments through which the invention may be practiced. It is understood that other embodiments may be utilized and structural changes may be made without departing from the scope of the present invention. In the drawings:

FIG. 4 illustrates a secure request packet structure using an embodiment of the invention; and, FIG. 5 illustrates a secure response packet structure using an embodiment of the invention.

DETAILED DESCRIPTION

Figure 1:
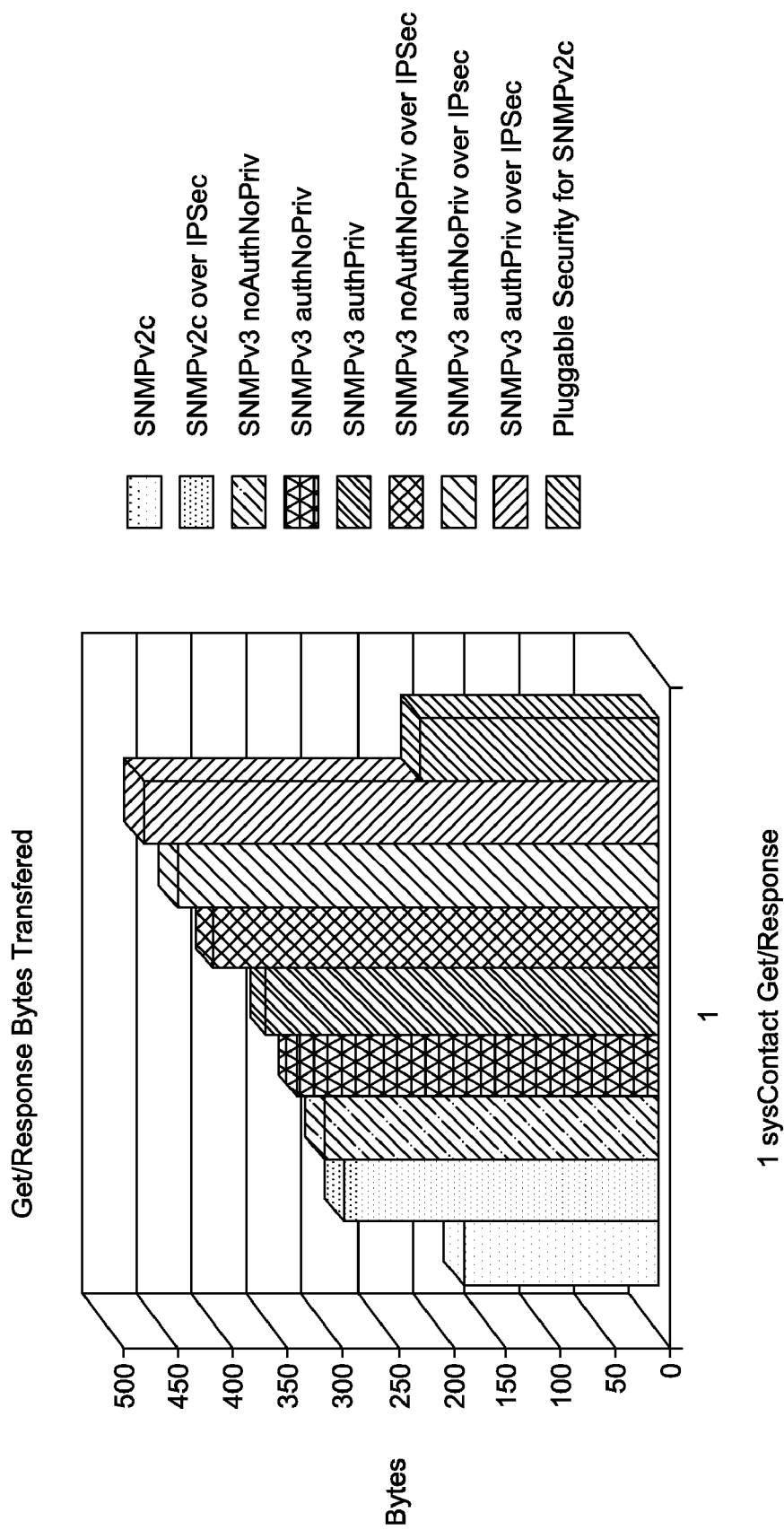
FIG. 1 shows IP Packet sizes in Bytes for 1-variable SNMP-Get operation for different types of security protection.

A detailed description of embodiments of the invention is provided below in conjunction with the accompanying figures that illustrate by way of example the principles of the invention. While the invention is described in connection with such embodiments, it should be understood that the invention is not limited to any embodiment. On the contrary, the scope of the invention is limited only by the appended claims and, the invention encompasses numerous alternatives, modifications and equivalents. For the purpose of example, details are set forth in the following description in order to provide a thorough understanding of the present invention.

The present invention may be practiced according to the claims without some or all of these specific details. For the purpose of clarity, technical material that is known in the technical fields related to the invention has not been described in detail so that the present invention is not unnecessarily obscured.

It is to be noted in the context of this invention that encryption of information may be done in any suitable manner such as by using a Triple DES (Data Encryption Standard) algorithm. Also, authentication herein is achieved by the help of MD5 (Message Digest 5). Specifically, in the illustrations used herein, authentication and encryption are done by implementing MD5 and Triple DES. It is further noted that the sequence of operation while sending a packet includes encryption and adding an authentication digest, whereas, while receiving a packet, authentication takes the form of decryption.

The present inventive approach is based on three main features, which include:

Secure Network Management,

Maintain the existing protocol implementation, and

Reduce additional network overhead.

The solution proposes a Pluggable Security Application at the sending and receiving ends, which runs both on manager and agent side. The Manager side Security Application (MSA) can be installed in the same system as the manager or can be installed on a dedicated system on the same LAN through which a set of managers can be served. The Agent side Security Application (ASA) is installed on a dedicated system in the same LAN of the Agent, which can be used to support multiple agents. The MSA and ASA operations by way of example are as below.

Manager side Security Application (MSA)
1. SNMP request from Manager is sent to MSA, which is encrypted and appended with authentication digest and sent to ASA.
2. MSA receives the secured response packet from the ASA, authenticates, decrypts and forwards the same to a respective manager. The manager is selected based on request ID, which is maintained in a data structure.
3. MSA receives the secured trap packet, authenticates, decrypts and sends the trap to the intended manager specified by ASA.

Agent side Security Application (ASA)
1. ASA receives the secure request packet from MSA, authenticates, decrypts and forwards to the agent. The agent's response is secured and sent back to MSA.
2. ASA receives the plain SNMP response from agent, encrypts, authenticates and forwards it to the requested manager.
3. The Trap from registered agents are received, encrypted, appended with authentication digest and forwarded to the corresponding manager as per configuration. The manager information is included in the secured packet which is sent to the ASA MSA and ASA Operation in One Embodiment:

MSA: When a packet from manager arrives at MSA, a new request Id is generated for the outgoing secured packet to ASA. The oldRequestId and the newRequestId are maintained in a data structure, so that when the response comes back, the newRequestId can be again replaced with the oldRequestId for sending back to the manager.

The request packet is directly sent to MSA but there are different agents. In order to signify different agents, the MSA can expediently have multiple ports. It is noted that the request received by MSA in each port signifies a specific agent. This should be configurable in MSA.

While the secured packet is sent to ASA, the agent IP should also be put inside the packet, since otherwise the ASA cannot decide to which agent this packet should be sent.

When a secured trap is received, the MSA simply has to take the manager's IP in the packet and send a plain trap to the same IP.

ASA: The ASA receives the secured request packet from MSA. It also generates a newRequestId for the outgoing packet to agent. The old and newRequestId are maintained in a data structure so as to get back the old request Id to send the secured response back to MSA, when a response is received from the agent.

The ASA just takes the Agent IP present in the secured request packet and sends the plain request to the same IP.

In case of traps, the ASA maintains multiple ports where each port signifies one manager. This information has to be configurable in ASA. The agent has to be configured with the ASA's IP address with different ports for different managers, for trap registration.

The secured trap packet should contain the manager's IP, since otherwise the MSA cannot know to which manager the trap has to be sent.

More specifically, FIG. 1 shows a bar graph of IP packet sizes (bytes) for 1 variable SNMP-Get operation, wherein it is seen that the bytes-burden for SNMPv2c that uses the inventive approach is not as high as the bytes for other methods of securing protection. It is noted in particular that for the SNMPv2c approach the total byte size is 218 which is considerably less than the bytes-burden for other methods of securing protection. The Table 1 below shows the bytes-burden for different methods of securing protection, compared to the present invention.

The following Table 1 shows exemplary values of numerical IP packet sizes in Bytes for 1-variable SNMP-Get operation:

TABLE 1

| | Security Scheme | | |
| --- | --- | --- | --- |
| SNMP Version | GET Packet | RESPONSE Packet | TOTAL |
| SNMPv2c | 79 | 101 | 180 |
| SNMPv2c over IPSec | 136 | 152 | 288 |
| SNMPv3 noAuthNoPriv | 142 | 164 | 306 |
| SNMPv3 authNoPriv | 154 | 176 | 330 |
| SNMPv3 authPriv | 167 | 191 | 358 |
| SNMPv3 noAuthNoPriv over IPSec | 192 | 216 | 408 |
| SNMPv3 authNoPriv over IPSec | 208 | 232 | 440 |
| SNMPv3 authPriv over IPSec | 224 | 248 | 472 |
| Pluggable Security for SNMPv2c | 101 | 117 | 218 |

Figure 2:
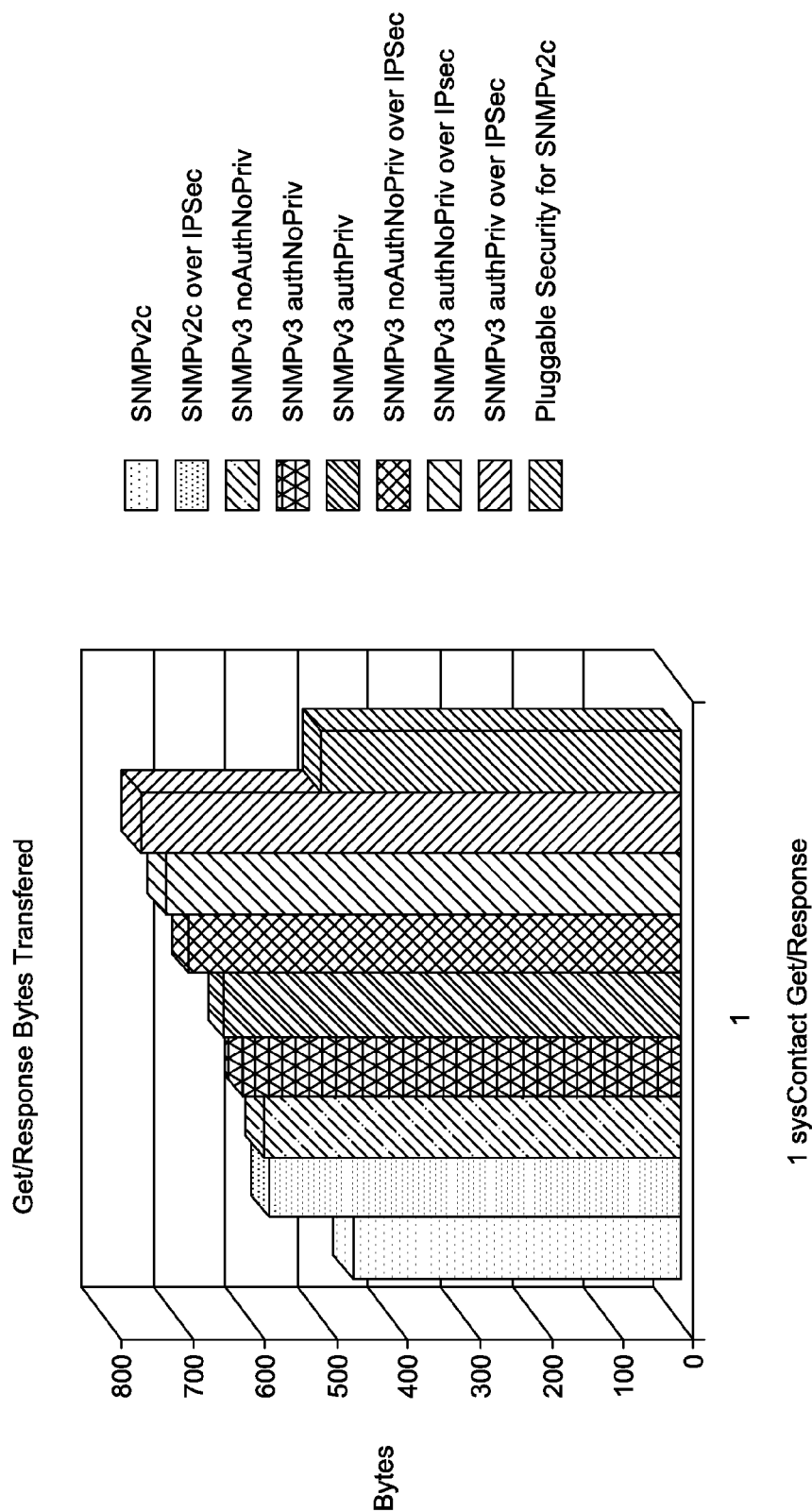
FIG. 2 shows IP Packet sizes in Bytes for 12-variable SNMP-Get operation for different types of security protection.

FIG. 2 shows a bar graph of IP packet sizes (bytes) for 12 variable SNMP-Get operation, wherein it is seen that the bytes-burden for SNMPv2c that uses the inventive approach is not as high as the bytes-burden for other methods of securing protection. It is noted in particular that for the SNMPv2c approach the total byte size is 506 which is considerably less than the bytes-burden for other methods of securing protection. The Table 2 below shows the bytes-burden for different methods of securing protection, compared to the present invention.

The following Table 2 shows IP packet sizes for 12-variable SNMP-get operation:

TABLE 2

| | Security Scheme | | |
| --- | --- | --- | --- |
| SNMP Version | GET Packet | RESPONSE Packet | TOTAL |
| SNMPv2c | 175 | 287 | 462 |
| SNMPv2c over IPSec | 232 | 344 | 576 |
| SNMPv3 noAuthNoPriv | 238 | 350 | 588 |
| SNMPv3 authNoPriv | 250 | 362 | 612 |
| SNMPv3 authPriv | 264 | 377 | 641 |
| SNMPv3 noAuthNoPriv over IPSec | 288 | 400 | 688 |
| SNMPv3 authNoPriv over IPSec | 304 | 416 | 720 |
| SNMPv3 authPriv over IPSec | 320 | 432 | 752 |
| Pluggable Security for SNMPv2c | 201 | 305 | 506 |

Tables 1 and 2 above are given only as examples to show different scenarios so as to enable the reader to appreciate the efficacy of the present inventive approach. It is noted that secure SNMP can be administered very efficiently over the internet by the use of the present invention.

Figure 3:
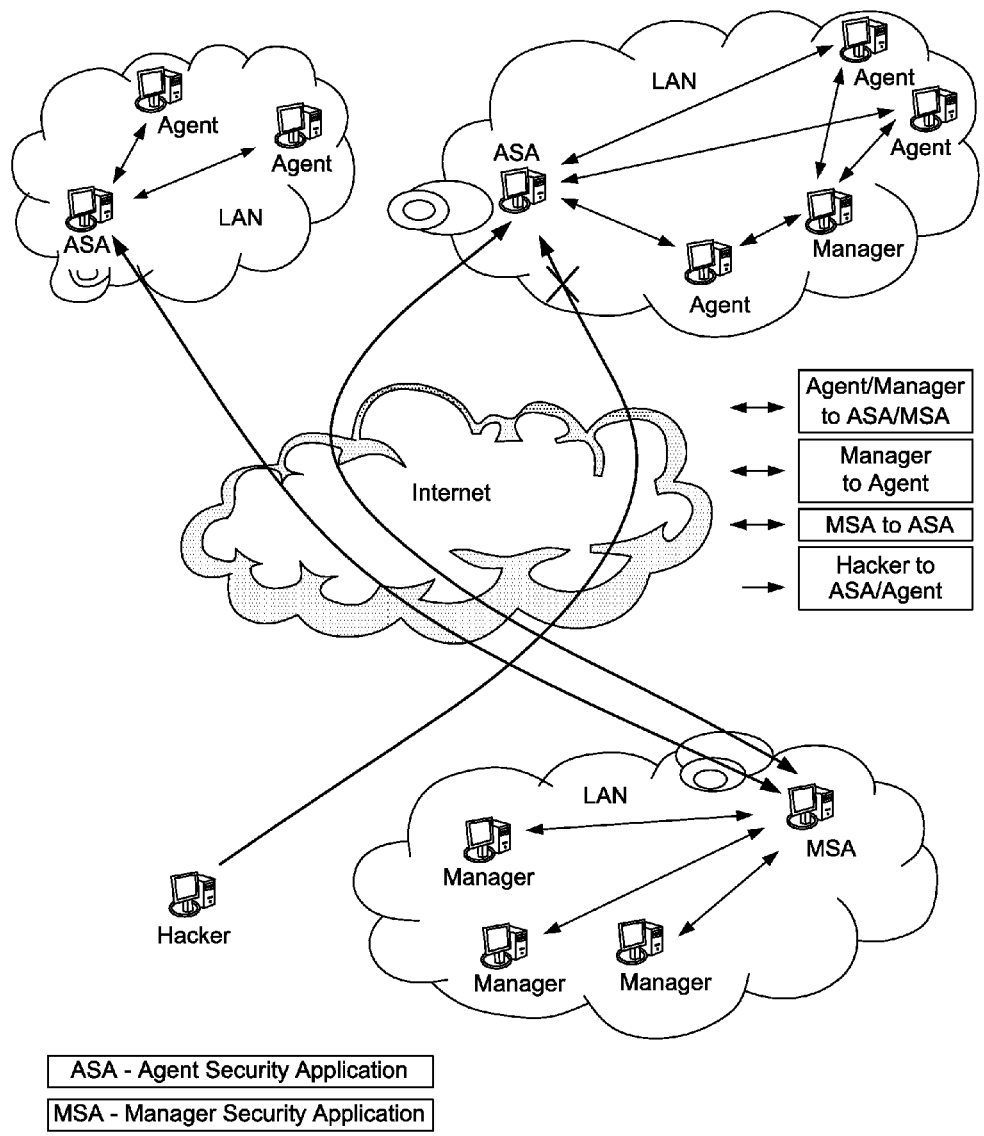
FIG. 3 illustrates a deployment scenario for an embodiment of the present pluggable security.

FIG. 3 shows an illustration of the deployment scenario of an embodiment of the present invention as applied to a LAN (Local Area Network) that interacts with a plurality of managers and a plurality of agents. FIG. 3 illustrates the presence of a hacker who intends to sniff the transmitted information but is unable to, because of deployment of the present invention. As shown in the FIG. 3, there are three deployment scenarios.

- Manager and Agent through internal network
- Authorized Manager and Agent through external network (internet)
- Unauthorized Manager (Hacker) and Agent through external network (internet)

In the first scenario since both the manager and agent are in the same network, requests from manager are directly sent to the agent without passing through MSA or ASA. Any SNMP traffic coming from outside the network should pass through ASA, thus requests from unauthorized manager are discarded by ASA.

In the second scenario, the manager and the agent are connected through an external network such as the internet. The third scenario is similar to the second one, but there is a hacker additionally.

FIGS. 4 and 5 show illustrations of secure request packet and a secure response packet as understood in the implementation of the present invention. Both FIGS. 4 and 5 show by way of example the packet length, MD5 digest and the encrypted portion.

The table 3 below illustrates comparative advantages of the present inventive approach as compared with SNMPv3:

TABLE 3

| SNMPv3 | Proposed Solution |
|---|---|
| Agent Overhead | |
| Security is provided by the agent directly. This includes cryptographic computations, authentication and access control. Normally SNMP is a low priority thread whereby it becomes an overhead for the agent to handle such costly computations unless some good resources are provided. | Security is handled by ASA instead of the agent itself. As the ASA runs on a standalone machine, it can perform cryptographic calculations much better, thereby keeping the agent simple. |
| Network Overhead | |
| SNMPv3 contains many security parameters in addition to actual PDU (Protocol Data Unit) which makes the packet heavy. In case of frequent pooling, it adds to the network overhead. | The security model and keys are predetermined and known to the authorized parties, thereby transmitting only a few fields and making the packet advantageously light. |
| Configuration & Administration | |
| Each agent should be configured with a corresponding username, authentication keys, privacy keys, etc. This makes the administration difficult. | Each ASA is configured with a security key, a list of agents supported and a list of managers to be notified about trap. Though this looks like a lot of configuration, there exists only one ASA for the entire LAN. Consequently, the management of all the agents behind a LAN boils down to managing only a single ASA. |
| Security & Access Features | |
| SNMPv3 provides user-based security and view-based access control. | The security and authentication are ASA based. The authentication in ASA is used for authorizing a MSA but not the Manager. The Manager is |

TABLE 3-continued

| SNMPv3 | Proposed Solution |
|---|---|
| | authorized using the community string by the Agent. |

It is seen from the above table 3 that enhanced security features offered by the inventive approach are easy to deploy over the existing SNMPv2 infrastructure, thereby reducing the overhead over that created by SNMPv3. Further, SNMPv3 places a considerable overhead on agents by adding more computational load which might degrade the performance of the devices. The security features offered by the inventive approach will not add any computation load on the agents. By using pluggable security modules, it is easy for the network administrators to manage and monitor their existing network including wireless networks remotely in a secured manner.

The advantages offered by the present inventive approach include the features:
- Cost effective solution,
- Easily Pluggable,
- Reduced agent overhead,
- Reduced network overhead,
- Easy configuration and administration, and,
- Can be used with different types of wireless networks.

The present invention includes a computer readable medium encoded with software data/instruction which when executed by a computing platform would result in execution of a method as described and claimed herein. Different embodiments of the present subject matter can be implemented in software which can be used in any suitable computing environment. The embodiments of the present subject matter are also operable in a number of general-purpose or special-purpose computing environments, or processors or processing units. Some computing environments include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to execute code stored on a computer-readable medium or computer memory elements. The embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as referred to hereinabove, includes any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

In the foregoing detailed description of embodiments of the invention, various features may be found grouped together in a single exemplary embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims and their equivalents. Many other embodiments will be apparent to those of skill in the art upon reviewing the above description. The scope of the invention should therefore be determined with reference to the appended claims, along with the full scope of equivalents to which such claims are entitled. In the appended claims, the terms "including" and "in which" are used as the plain-English equivalents of the respective terms "comprising" and "wherein," respectively.

The invention claimed is:

1. A method of providing security in network management for SNMP (Simple Network Security Management Protocol) packet traffic between a set of one or more managers and a set of one or more agents in a computing environment, the method including the steps of:

using a manager side security application (MSA), installed on a computer in one or more local area networks (LANs), for serving the one or more managers and an agent side security application (ASA), installed on a computer in one or more LANs, for serving the one or more agents;

sending an SNMP request from a respective manager to the MSA, where the MSA encrypts said SNMP request and adds an authenticating digest thereto to form a secured request packet;

the MSA sending the secured request packet to the ASA, where the ASA authenticates and decrypts the secured request packet to extract the SNMP request;

the ASA sending the SNMP request to a respective agent, where the respective agent sends an SNMP response to the ASA in return;

the ASA encrypting said SNMP response and adding an authenticating digest thereto to form a secured response packet;

the MSA receiving the secured response packet from the ASA, where the MSA authenticates and decrypts the secured response packet to extract the SNMP response;

the MSA forwarding the SNMP response to the respective manager; and, if the MSA receives a secured trap packet from the ASA, then the MSA authenticating and decrypting the secured trap packet, and sending the secured trap packet to a specific intended manager.

2. The method as in claim 1, wherein the specific intended manager is specified by the ASA.

3. The method as in claim 1, including the step of selecting said respective manager based on a request ID.

4. The method as in claim 3, including the step of maintaining said request ID in a data structure.

5. The method as in claim 1, including the steps wherein a trap packet from a registered agent is received by the ASA and forwarded to the specific intended manager via the MSA as a predetermined configuration.

6. The method as in claim 5, comprising an added step of including the specific intended manager information in the trap packet which is sent to the ASA.

7. The method as in claim 1, wherein the SNMP comprises SNMPv2c.

8. The method as in claim 1 wherein the SNMP comprises SNMPv2c implemented over internet.

9. The method as in claim 1, including the step of arranging the one or more managers and the one or more agents through an internal network.

10. The method as in claim 9, including the step of arranging the intended respective manager and the registered agent through an internal network.

11. The method as in claim 1, including the step of arranging the one or more managers and the one or more agents through an external network such as the internet.

12. A method of providing security in network management for SNMP (Simple Network Security Management Protocol) packet traffic over internet between a set of one or more managers and a set of one or more agents, said method comprising using a pluggable security application function in a computing environment, the method including the steps of:

using a manager side security application (MSA), installed on a computer in one or more local area networks (LANs), for serving the one or more managers and an agent side security application (ASA), installed on a computer in one or more LANs, for serving at the one or more agents;

upon a SNMP request from a manager to the MSA, encrypting, adding authentication digest and sending the request to a registered agent via the ASA;

the MSA receiving a secured response packet back from the ASA, authenticating, decrypting and forwarding it to an intended respective manager.

13. The method of providing security in network management as in claim 12, wherein the step of selecting said intended respective manager is based on a request ID.

14. The method of providing security in network management as in claim 13, including the step of maintaining the request ID in a data structure.

15. The method as in claim 12, including the step wherein said secured response packet back from the ASA comprises a trap packet from the registered agent which is received and forwarded to said intended respective manager in a predetermined configuration.

16. The method as in claim 12, comprising an added step of including certain manager information in the secured response packet.

17. The method as in claim 12, including the step of arranging the intended respective manager and registered agent through an external network such as the internet.

18. A computer readable storage medium encoded with data/instruction which when executed by a computing platform, results in execution of a method as in claim 1.

19. A computer readable storage medium encoded with data/instruction which when executed by a computing platform, results in execution of a method as in claim 12.

* * * * *